United States Patent [19]
Raboin et al.

[11] Patent Number: 5,503,246
[45] Date of Patent: Apr. 2, 1996

[54] CRANKCASE OIL DRAIN PAN

[75] Inventors: Ronald Raboin, DePere, Wis.; Allan Brown, Rochester, N.Y.

[73] Assignee: Western Industries, Inc., Chilton, Wis.

[21] Appl. No.: 372,764

[22] Filed: Jan. 13, 1995

[51] Int. Cl.⁶ ..................................... F16C 3/14
[52] U.S. Cl. ............... 184/1.5; 184/106; 220/573; 141/98; 280/47.24
[58] Field of Search ............ 184/1.5, 106; 220/573, 220/601, 771, 772; 141/98; 280/47.24

[56] References Cited

U.S. PATENT DOCUMENTS

| | | | |
|---|---|---|---|
| D. 246,456 | 11/1977 | Mitsui | D15/1 |
| D. 317,117 | 5/1991 | Pollacco | 220/1 |
| D. 331,791 | 12/1992 | Ferguson | D23/202 |
| 1,506,028 | 8/1924 | Perritt | 220/573 |
| 1,554,589 | 9/1925 | Long | 220/573 |
| 1,568,830 | 1/1926 | Gunderson | 220/573 |
| 1,880,546 | 10/1932 | Wanamaker . | |
| 3,410,438 | 11/1968 | Bartz | 220/1 |
| 3,944,199 | 3/1976 | Johnson | 269/15 |
| 4,010,863 | 3/1977 | Ebel | 220/573 |
| 4,086,981 | 5/1978 | Mitsui | 184/1.6 |
| 4,296,838 | 10/1981 | Cohen | 184/106 |
| 4,301,841 | 11/1981 | Sandow | 141/98 |
| 4,315,561 | 2/1982 | Partridge | 184/106 |
| 4,403,692 | 9/1983 | Pollacco | 206/223 |
| 4,488,584 | 12/1984 | Hestehave et al. | 141/339 |
| 4,513,865 | 4/1985 | Melzi et al. | 206/508 |
| 4,524,866 | 6/1985 | Pollacco | 206/223 |
| 4,533,042 | 8/1985 | Pollacco | 206/223 |
| 4,592,448 | 6/1986 | Morris | 184/1.5 |
| 4,632,268 | 12/1986 | Melzi et al. | 220/1 |
| 4,750,775 | 6/1988 | Miller | 296/38 |
| 4,775,067 | 10/1988 | Mount | 184/106 |
| 4,802,599 | 2/1989 | Hill | 220/1 |
| 4,823,947 | 4/1989 | Maynard, Jr. | 141/98 |
| 4,881,650 | 11/1989 | Bartz | 141/98 |
| 5,092,457 | 3/1992 | Islava et al. | 206/223 |
| 5,190,085 | 3/1993 | Dietzen | 141/98 |

FOREIGN PATENT DOCUMENTS 5286421  11/1993  Japan ................. 220/573

Primary Examiner—Thomas E. Denion
Attorney, Agent, or Firm—Foley & Lardner

[57] ABSTRACT

The invention provides a container for collecting, storing and transporting a liquid. The container includes a hollow container body having a top wall having a central, inwardly directed fluid directing portion and an opening in the fluid directing portion for permitting liquid collected in the fluid directing portion to pour into the hollow container body. The container also has a spout sized for pouring out liquid collected in the container body. A roller assembly on an underside of the container body permits rolling movement of the container body along a supporting surface. The container also has suitable means such as bearing grooves for securing the roller assembly to the container body.

22 Claims, 3 Drawing Sheets

CRANKCASE OIL DRAIN PAN

FIELD OF THE INVENTION

The invention relates to a container for collecting, storing and transporting a liquid, more particularly to a container for collecting and storing oil from the crankcase of a motor vehicle such as a tractor used to pull a semi-trailer, a bulldozer, a backhoe or the like.

BACKGROUND OF THE INVENTION

Many containers have been devised for collecting waste oil as the oil is drained from the crankcase of an internal combustion engine of a motor vehicle. Crankcase oil is routinely and periodically drained by removing a drain plug from an opening in the crankcase, at the bottom of the engine. A container is placed beneath the crankcase to catch the oil as it drains. After the oil is drained, the drain plug is replaced and fresh oil is poured into a fill opening on the engine. The waste oil is then discarded.

Environmental concerns now dictate against the formerly common practice of disposing of waste oil on the ground or otherwise directly into the environment. Waste oil is now preferably either recycled or disposed of in an environmentally safe manner. Therefore, containers have been developed which allow either collection of oil in the container and subsequent storage of the collected oil directly in the container or transportation of the oil to an oil recycling facility for recycling. After the waste oil is poured from the container at the recycling facility, the container is again available for use.

Such prior art containers have been limited to collecting oil from the crankcase of relatively small engines, such as the type of engine used in a passenger automobile. A passenger automobile engine typically has a capacity of four or five quarts of oil. When drained from the crankcase into a container, four or five quarts of oil weighs less than 20 pounds including the container. A container full of waste oil weighing 20 pounds is readily carried by an individual user to the recycling center or other storage facility. Twenty pounds is also light enough so that an individual user can easily lift and pour a container full of four or five quarts of oil to empty the container at the recycling center.

However, large vehicles, such as the truck tractors used to pull semi-trailers and construction equipment including bulldozers, backhoes and the like, have engines which hold much more oil than an automobile engine. Such engines may have a capacity of fifty quarts of oil. Fifty quarts of oil and a suitable container weighs approximately 200 pounds. A container holding waste oil and weighing 200 pounds is too heavy for a single individual to lift. Also, a container holding such a quantity of oil is too heavy for comfortably and accurately pouring the contents. Such a container is too heavy for even two individuals to easily carry and maneuver.

Moreover, a container large enough to hold fifty quarts of oil may be difficult to maneuver when empty. This is especially true when placing or removing the container under the vehicle. Because the crankcase drain plug on the vehicle is generally located in the center of the vehicle, the container must be placed approximately under the center of the vehicle. Since a vehicle such as a truck tractor or bulldozer is very large, maneuvering the container to locate it under the drain plug may be difficult while standing on the ground adjacent the vehicle. Accurate positioning may require laying on the aground adjacent or even under the vehicle to place the container under the crankcase drain plug.

In addition to maneuvering the empty container, such a large container may be difficult to maneuver when partially or completely full of waste oil. Since lifting a 200 pound container is impractical, the container may have to be maneuvered across a variety of surfaces, including concrete floors, blacktop driveways, gravel driveways, packed or soft dirt and grass.

Accordingly, there is a need in the art for a container for collecting, storing and transporting large quantities of waste oil from the crankcase of an engine.

SUMMARY OF THE INVENTION

The invention therefore provides a container for collecting, storing and transporting a liquid capable of achieving these goals. The container comprises a hollow container body having a top wall having a central, inwardly directed fluid directing portion and an opening in the fluid directing portion for permitting liquid collected in the funnel-shaped portion to pour into the hollow container body. A spout is provided for pouring out liquid collected inside the container body, and a rolling assembly mounted on an underside of the container body permits rolling movement of the container body along a supporting surface.

According to a preferred form of the invention, the container body has generally horizontal top and bottom walls. A pair of first and second vertical side walls, a vertical front wall and a vertical rear wall join the top and bottom walls to define a chamber for storing the liquid. The spout extends outwardly from the front wall, preferably near its uppermost end. The spout has an elongated hollow tubular neck and a mouth for pouring liquid from the chamber. The bottom and rear walls form an elongated recess or cavity along the edge where the bottom and rear walls meet. The roller assembly is secured within this elongated cavity by suitable means. In accordance with this embodiment, the neck of the spout may be configured to act as a handle for tilting the container and pulling it along when the front end of the container is raised to transport the liquid.

BRIEF DESCRIPTION OF THE DRAWINGS

The invention, together with further objects and advantages thereof, may best be understood by making reference to the following description taken in conjunction with the accompanying drawings, in the several figures of which like reference numerals identify identical elements, and wherein.

DETAILED DESCRIPTION OF THE PREFERRED EMBODIMENT

Figure 1:
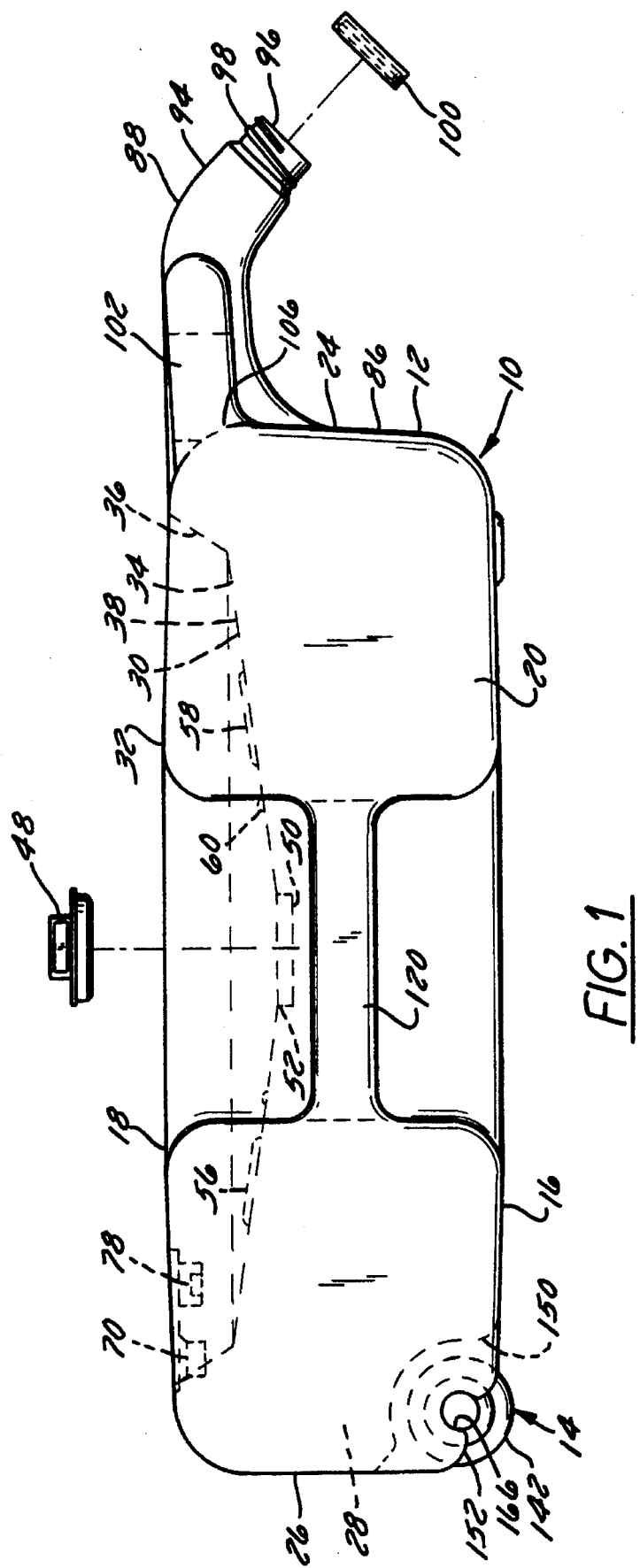
FIG. 1 is a side elevational view of a container according to the present invention.
Figure 3:
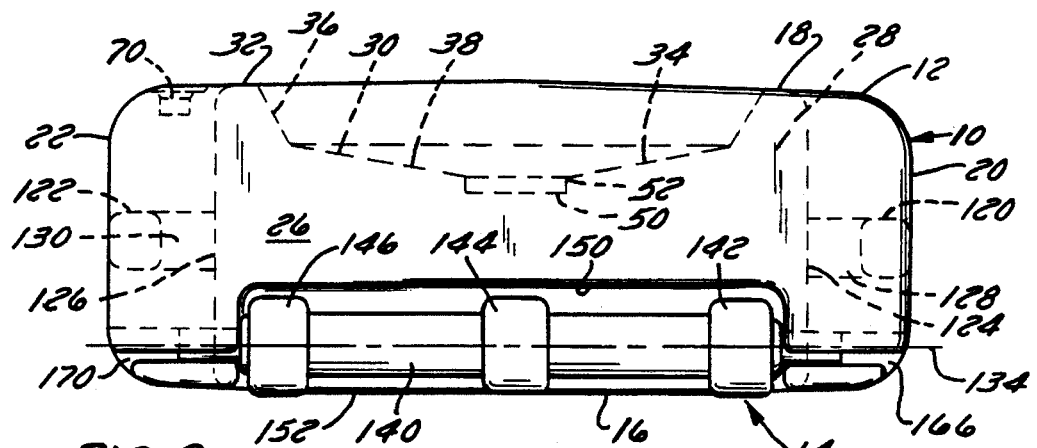
FIG. 3 is a rear elevational view of the container of FIG. 1.
Figure 2:
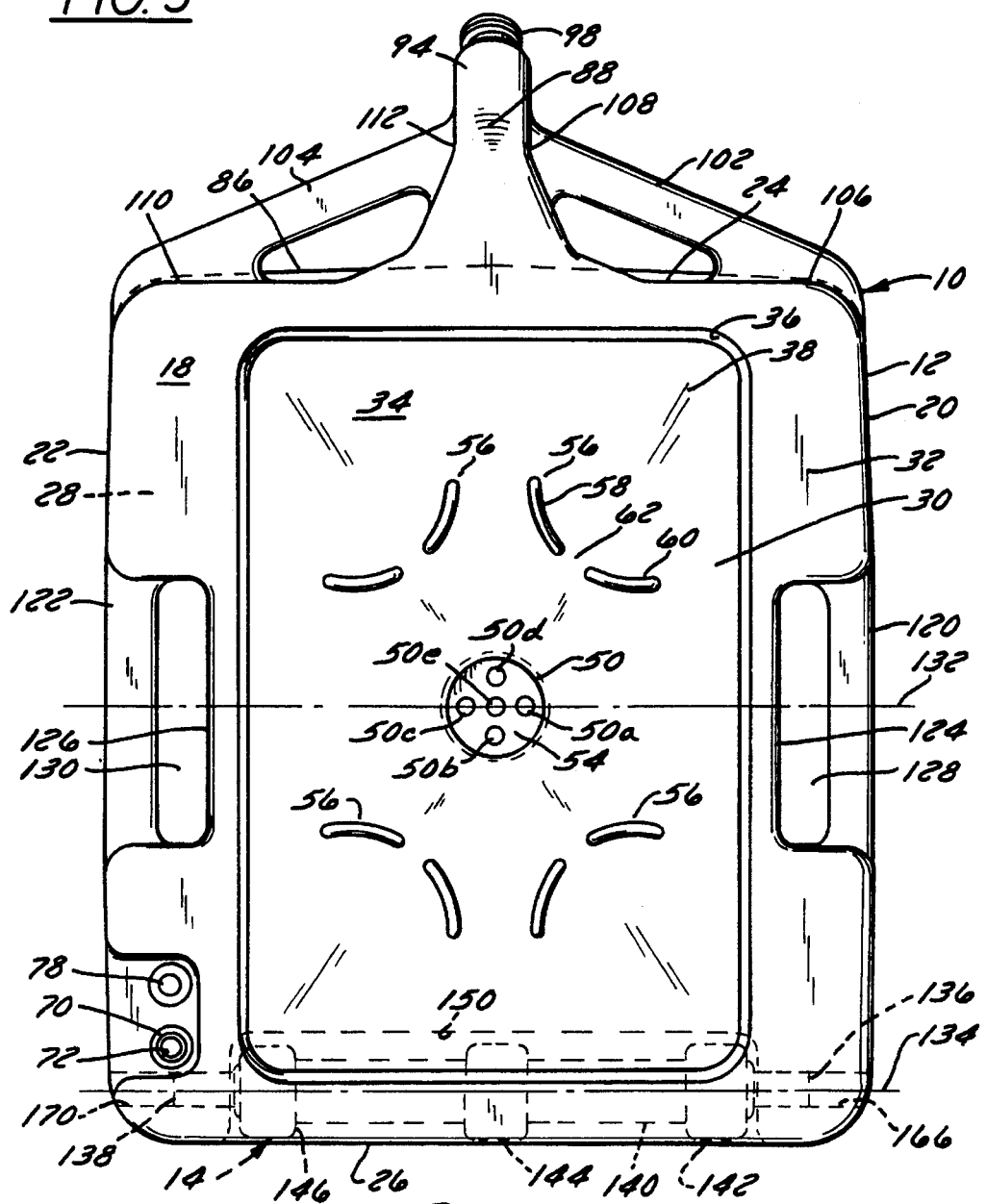
FIG. 2 is a top view of the container of FIG. 1.
Figure 5:
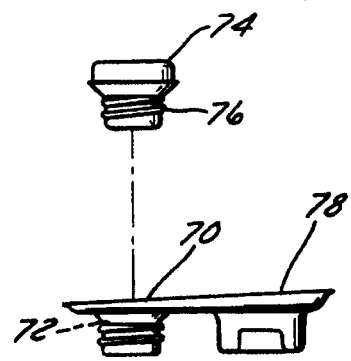
FIG. 5 is a partial, exploded side view of the vent assembly of the container of FIG. 2 with the vent cap removed.
Figure 4:
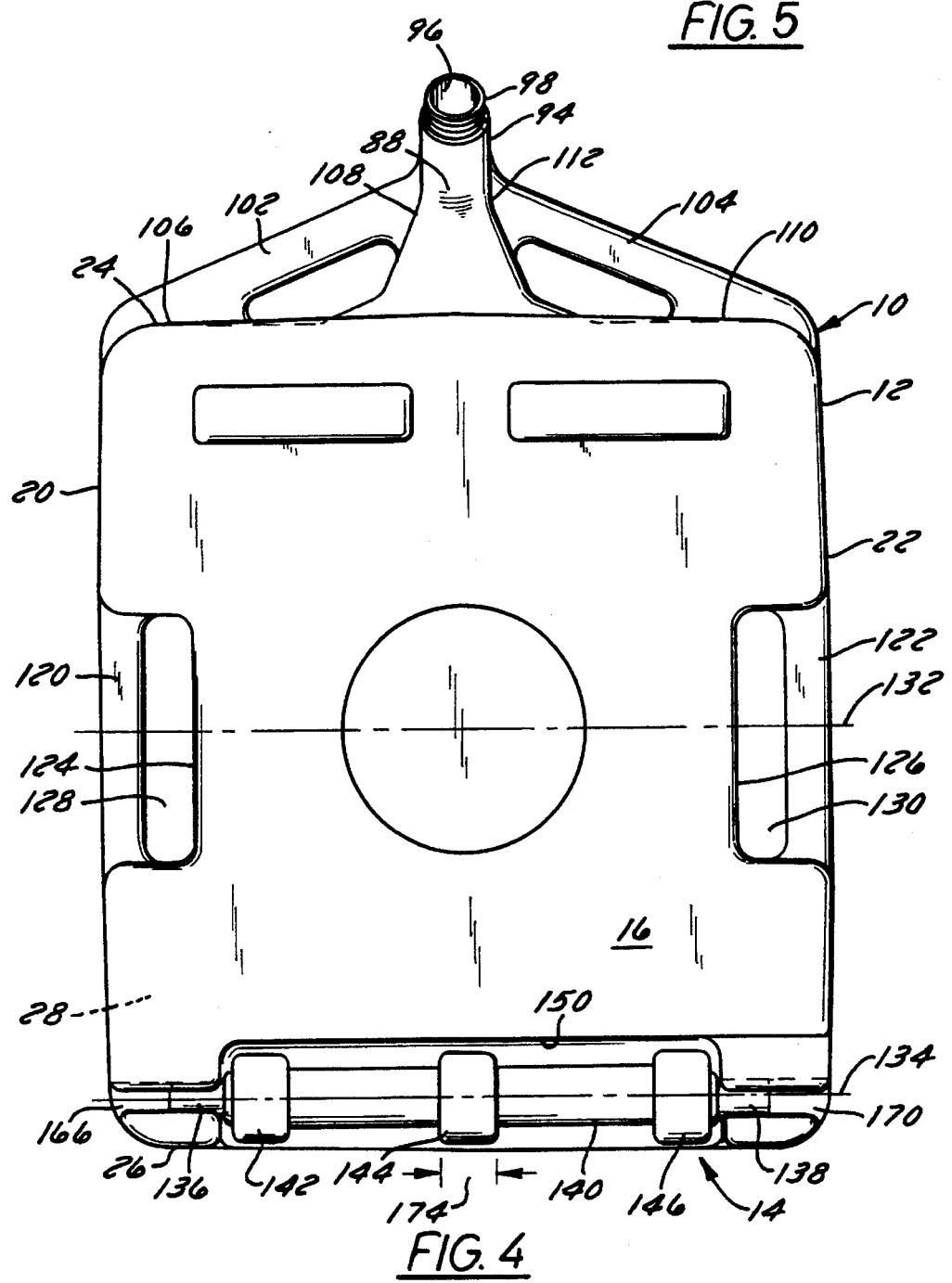
FIG. 4 is a bottom view of the container of FIG. 1.

Referring now to FIGS. 1–5, a container 10 in accordance with the present invention includes a container body 12 and a rolling assembly or roller 14. Container body 12 includes a bottom wall 16 and a top wall 18. A first side wall 20, a second side wall 22, a front wall 24 and a rear wall 26 join bottom wall 16 and top wall 18 to define a hollow internal chamber 28 for storing liquid such as waste engine oil. Container body 12 and roller 14 are preferably manufactured of a strong, light, plastic material such as high density polyethylene (HDPE), blow molded to the shape illustrated in FIGS. 1–5. The material used to fabricate container body 12 and roller 14 should be chemically impervious to liquids such as engine oil, even at elevated temperatures such as 170° F. Chamber 28 preferably holds as much as 50 quarts of liquid, but may be sized larger or smaller to accommodate particular needs.

Top wall 18 has an inwardly directed fluid directing portion 30 and a flat circumferential portion 32. Fluid directing portion 30 has an inwardly and downwardly sloping surface 34, including a shallowly sloped portion 38 separated from the flat portion 32 of top wall 18 by a steeply sloped rectangular rim portion 36. A fill opening 50 in top wall 18 at the lowermost end 52 of the sloping surface communicates with chamber 28.

Top wall 18 is configured to collect waste oil drained from the crankcase of the internal combustion engine of a motor vehicle (not shown) when container 10 is placed beneath the crankcase. Oil is drained from the crankcase by removing a bolt or drain plug from the crankcase and allowing the oil to flow gravitationally from the crankcase. In addition, an oil filter cartridge (not shown) may be removed from the engine block in order to drain waste oil from the oil filter cartridge and subsequently replace the oil filter cartridge. With the container placed beneath the crankcase, the oil strikes the sloping surface 34 of top wall 18 and flows through fill opening 50 into chamber 28 for storage within chamber 28.

Sloping surface 34 is configured to collect virtually all oil striking sloping surface 34 and minimize splashing of oil from sloping surface 34. In addition to the mess created by oil which splashes from the sloping surface 34 onto the surrounding floor or work surface, splashing oil may be hot and pose a safety hazard. Sloping surface 34 is thus configured to locate fill opening 50 substantially near the center of fluid directing portion 30. This minimizes splashing of oil which strikes sloping surface 34 and contains the oil within the fluid directing portion 30 as sloping surface 34 collects the oil. To minimize splashing of oil, sloping surface 34 should be as steeply sloped as possible. Placing fill opening 50 away from the center of fluid directing portion 30 would require one portion of the shallowly sloped portion 38 to be less steeply sloped than another portion of shallowly sloped portion 38 and would increase the likelihood of splashing of oil from fluid directing portion 30. Steeply sloped portion 36 of sloping surface 34 helps to contain oil within fluid directing portion 30 so that the oil may flow through fill opening 50 and not splash outside fluid directing portion 30.

Fill opening 50 is preferably partially blocked by a grate 54 having several holes 50a, 50b, 50c, 50d, 50e which allow oil collected by sloping surface 34 to flow into chamber 28. Holes 50a–50e are smaller than the bolt or drain plug (not shown) which seals the crankcase, so that if the bolt or drain plug accidentally falls on top wall 18, grate 54 prevents the drain plug from falling into chamber 28. Container 10 may be provided with a detachable plug 48 sized for plugging opening 50. Plug 48 seals opening 50 to prevent leakage of liquid from opening 50 when the front end of container 10 is lifted.

Sloping surface 34 preferably includes one or more arcuate bosses 56. Each boss opens outwardly and is sized to receive an end of a cylindrical oil filter cartridge which has been removed for draining. Boss 56 holds the oil filter cartridge on sloping surface 34 to allow oil to drain from the oil filter cartridge to the fill opening 50 and into chamber 28. Preferably, each boss 56 includes a first boss section 58 and a second boss section 60, separated by a flat drain space 62. Oil drained from the filter cartridge may flow through the flat drain space 62 to fill opening 50. Since oil filter cartridges come in different standard diameters, the sloping surface 34 may include a plurality of spaced bosses 56 of different curvature, each sized to receive one of the standard diameter oil filter cartridges.

Flat portion 32 of top wall 18 includes a recessed circular vent opening 70 which communicates with chamber 28. The inner periphery 72 of vent opening 70 is threaded to receive a detachable vent cap 74 which has a similarly threaded outer periphery 76. Vent cap 74 may be screwed into vent opening 70 to seal chamber 28. Vent cap 74 may also be unscrewed and removed from vent opening 70 to allow air to escape chamber 28 when chamber 28 is being filled with oil, or to allow air to enter chamber 28 when chamber 28 is being emptied. In place of the threads on the inner periphery 72 and outer periphery 76, vent opening 70 and vent cap 74 may be arranged to seal the vent opening in a snap fit fashion, or in any other manner which establishes a substantial seal between vent opening 70 and vent cap 74. A recess 78 adjacent to vent opening 70 is sized to receive vent cap 74 when vent cap 74 is removed from the vent opening. Storing vent cap 74 in recess 78 prevents loss of the vent cap when container 10 is being filled or emptied.

Front wall 24 includes a flat vertical portion 86 and a spout 88. Spout 88 has a hollow tubular neck 94 which is in communication with chamber 28 and a mouth 96 in communication with neck 94 to permit emptying of liquid in chamber 28. A rim 98 of mouth 96 is threaded to secure a detachable cap 100 for closing mouth 96.

Neck 94 is bent downwardly at an angle, e.g., from 30 to 60 degrees, to facilitate insertion of spout 88 in a receptacle such as an oil recycling receptacle when container 10 is lifted to empty container 10. Downwardly bent neck 94 also allows spout 88 to be more readily grasped as a handle for lifting the front end of container 10 and positioning it beneath the crankcase of a vehicle. By grasping spout 88, a user need not crawl under the vehicle to place container 10. Instead, the user may place container 10 accurately beneath the crankcase while remaining next to the vehicle. The curvature of neck 94 of spout 88 also tends to prevent siphoning of liquid from container 10 if the flow of liquid starts accidentally while container 10 is at rest on the ground.

Neck 94 may further have a pair of reinforcing handles 102, 104. The first reinforcing handle 102 extends between a front corner 106 of front wall 24 and a first side wall 108 of spout 88. The second reinforcing handle 104 similarly extends between a front corner 110 of front wall 24 and a second side wall 112 of spout 88. Reinforcing handles 102, 104 reinforce spout 88 when it is used as a handle, and also provide points where container 10 may be readily grasped for transporting container 10. Reinforcing handles 102, 104 are preferably sized to accommodate an individual's hand to provide lifting points for container 10, and are preferably integrally fabricated with container 10 to maximize handle strength for lifting container 10.

A pair of side handles for lifting container 10 are also formed in the container body in the embodiment shown. The first side wall 20 and the adjoining top wall 16 and bottom wall 18 have recesses therein that define a first side handle 120 midway along the length of container 10. Second side wall 22 similarly includes a second side handle 122 identical to handle 120. Side handles 120, 122 are preferably flush with the associated side walls. To provide for secure grasping, first side handle 120 is separated from a recessed portion 124 of first side wall 20 by a first finger slot 128. Similarly, second side handle 122 is separated from a recessed portion 126 of second side wall 22 by a second finger slot 130.

When container 10 is fully loaded with a large amount of a liquid such as fifty quarts of waste oil, the container may weigh as much as 200 pounds. The four handles 102, 104, 120, 122 allow two individuals working together to lift, carry and pour container 10, one grasping handles 102, 120 and the other grasping handles 104, 122. Side handles 120, 122 are located along a central longitudinal axis 132 of container 10 and may thus be used to support the center of mass of container 10 and its contents. Reinforcing handles 102, 104 are located near spout 88 and thus may be used for guiding spout 88, for example, when inserting spout 88 in a receptacle, such as an oil recycling receptacle, when container 10 is lifted to empty container 10.

Roller 14 includes an axle 140 having a first cylindrical end 136, a second cylindrical end 138 and raised wheel portions 142, 144, 146. Axle 140 and wheel portions 142, 144, 146 rotate about an axis 134. Roller 14 is preferably formed from a single molded piece of a strong, light, plastic material such as high density polyethylene (HDPE).

Container body 12 includes an elongated, outwardly-opening cavity or recess 150 at the lower rear edge 152 of container 10 for mounting roller 14. Cylindrical ends 136, 138 snap-fit into a pair of outwardly-opening retaining grooves 166, 170 located at opposite ends of recess 150. Axle 140 is free to turn within the first and second grooves 166, 170, which thereby act as bearings for ends 136, 138. This arrangement is preferred insofar as grooves 166, 170 can be formed integrally with the container, but other conventional wheel or roller mechanisms could be employed, such as mounting roller 14 on brackets which are secured to container body 12. Alternatively, axle 140 could be fixedly mounted to container body 12, and wheel portions 142, 144, 146 could be fashioned as separate rings free to rotate around axle 140. As a further alternative, roller 14 could be replaced with casters or other rolling devices mounted in sockets at the lower rear corners of the container.

For transporting container 10, especially when container 10 is full of oil, the front end of container 10 may be lifted by grasping first reinforcing handle 102, second reinforcing handle 104, or spout 88. As the front end of container 10 is lifted, roller 14 rollingly supports the rear end of container 10. The container 10 may then be transported by rolling the container 10 across the supporting surface. Thus, container 10 may be transported by lifting only one-third to one-half its total weight, the balance of the container's weight being supported by roller 14.

Raised wheel portions 142, 144, 146 have a width 174 optimized for rollingly supporting container 10 on a variety of surfaces. Since narrow wheels would sink into soft surfaces, such as dirt, and wide wheels would create needless drag on hard surfaces such as concrete or blacktop, the width 174 as well as the number of raised wheel portions are preferably chosen to provide adequate support with minimal drag.

As can be seen from the foregoing, the invention provides a container for collecting and storing oil from the crankcase of a motor vehicle such as a truck tractor, a bulldozer, a backhoe or the like. The container is generally flat to allow the container to readily fit under the vehicle, and includes an extended spout on one end of the container, the spout forming a handle which allows positioning of the container under the vehicle by an individual located adjacent to the vehicle. The extended spout and associated handles allow the front end of the container to be lifted and the container rolled across a supporting surface without having to lift the entire weight of the container. The container further includes a concave or fluid directing upper surface for collecting liquid such as crankcase oil and which allows the liquid to drain directly into the container for storage, eliminating the need for a separate funnel to collect the liquid. The fluid directing upper surface covers most of the upper surface of the container so that location of the container under the drain plug of a crankcase is not critical.

While particular embodiments of the invention have been shown and described, modifications may be made. It is intended in the appended claims to cover all such changes and modifications which fall within the true spirit and scope of the invention.

We claim:

1. A container for collecting, storing and transporting a liquid, the container comprising:

a hollow container body having a top wall having a central, inwardly directed fluid directing portion and an opening in the fluid directing portion for permitting liquid collected in the fluid directing portion to pour into the hollow container body, and a spout for pouring out liquid collected in the container body; and a rolling assembly mounted on an underside of the container body, wherein the rolling assembly includes an elongated, cylindrical roller.

2. The container of claim 1, further comprising a cap configured for sealing the spout.

3. The container of claim 2, further comprising a plug sized for plugging the top wall opening.

4. The container of claim 1, wherein the roller is unitary and has at least two spaced, raised wheel portions that contact a support surface.

5. The container of claim 4, wherein the container body includes a pair of aligned grooves formed in the underside of the container body, and end portions of the roller are snap-fitted into the aligned grooves, which grooves act as bearings for supporting the roller.

6. The container of claim 1, wherein the rolling assembly is mounted in an elongated, outwardly-opening recess formed in a bottom wall of the container body.

7. The container of claim 6, wherein the recess is located along a lower corner of the container body and extends in parallel to a side wall thereof.

8. The container of claim 1, further comprising two pairs of handles formed on the container body, including a first set of handles on opposite sides of the spout, and a second set of handles spaced from the first set and formed approximately midway along the length of the container body.

9. The container of claim 8, wherein the spout is formed on a front side of the container body, and the rolling assembly is located near a rear side of the container body, so that a user gripping the spout can tilt the front end of the container body up and pull the container along on the rolling assembly.

10. The container of claim 1, wherein the container body and spout are integrally formed from molded plastic.

11. A container for collecting, storing and transporting a liquid, comprising:

a generally rectangular container body having a bottom wall and a top wall, first and second side walls, a front wall and a rear wall joining the bottom wall and the top wall and defining a chamber for storing the liquid, the top wall having a fluid directing portion with an inwardly and downwardly sloping surface for collecting the liquid and a fill opening at the lowermost end of the sloping surface, the fill opening being in communication with the chamber for pouring liquid collected by the sloping surface into the chamber, and the rear and bottom walls forming an elongated cavity along the lower rear edge of the container;

a spout extending outwardly from the front wall near an uppermost end thereof, the spout having a hollow tubular neck in communication with the chamber and a mouth in communication with the tubular neck for removing liquid from the chamber;

a roller disposed within the elongated cavity; and a pair of bearings disposed at opposite ends of the elongated cavity, opposite ends of the roller being journalled in the bearings.

12. A container as defined in claim 11, wherein the spout includes a neck which is bent downwardly to form a handle for lifting the front end of the container.

13. A container as defined in claim 11, wherein the top wall includes a vent opening offset from the fluid directing portion for admitting air to the chamber when liquid is removed from the chamber.

14. A container as defined in claim 11, wherein the fill opening is located near the center of the fluid directing portion.

15. A container as defined in claim 11, wherein the sloping surface includes at least one arcuate boss for engaging an oil filter cartridge placed on the sloping surface.

16. A container as defined in claim 15, wherein the arcuate boss includes two arcuate boss sections separated by a flat drain space, the flat drain space being proximate the fill opening.

17. A container as defined in claim 11, wherein the container further comprises a detachable plug for sealing the fill opening, and a grate covering the first opening, the grate being perforated by a plurality of holes having a predetermined size.

18. A container as defined in claim 11, wherein the container further comprises a first spout handle extending from one side of the front wall to a first side of the spout, and a second handle extending from a second side of the front wall to a second side of the spout.

19. A container as defined in claim 18, wherein the first side wall includes a first side handle and the second side wall includes a second side handle, the side handles being located substantially midway along the length of the side walls.

20. A container comprising:

a plastic, hollow container body having an opening for permitting liquid collected to pour into the container body, and a spout for pouring out liquid collected in the container body;

a plastic, elongated, cylindrical roller mounted on an underside of the container body; and a pair of retaining grooves integrally formed on the container body, the retaining grooves being configured to receive the roller.

21. The container of claim 20, wherein a spout is integrally formed on a front side of the container body, and the roller is located near a rear side of the container body, so that a user gripping the spout can tilt the front end of the container body up and pull the container along the roller.

22. The container of claim 20, further comprising two pairs of handles integrally formed on the container body, the two pairs including a first set of handles disposed on opposite sides of the spout, and a second set of handles spaced from the first set and formed approximately midway along the length of the container body.

* * * * *